(12) United States Patent
Pushparajah et al.

(10) Patent No.: US 12,248,526 B1
(45) Date of Patent: Mar. 11, 2025

(54) SYSTEM AND METHOD FOR DATABASE SEARCHING AND REPORTING

(71) Applicant: Veeva Systems Inc., Pleasanton, CA (US)

(72) Inventors: Dharssan Pushparajah, Richmond Hill (CA); Miodrag Milicevic, Toronto (CA); Mark Vidov, Toronto (CA); Kevin Chen, Toronto (CA); Nicholas Skupien, Oakville (CA); Yi Wu, Toronto (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 17/967,871

(22) Filed: Oct. 17, 2022

Related U.S. Application Data

(60) Provisional application No. 63/256,525, filed on Oct. 15, 2021.

(51) Int. Cl.
*G06F 16/9538* (2019.01)

(52) U.S. Cl.
CPC .............................. *G06F 16/9538* (2019.01)

(58) Field of Classification Search
CPC .. G06F 16/9538; G06F 16/951; G06F 16/381; G06F 16/955; G06F 16/93; G06F 16/3322; G06F 16/353; G06F 16/2428; G06F 16/3329; G06F 16/3344
See application file for complete search history.

(56) References Cited

U.S. PATENT DOCUMENTS

| | | | | |
|---|---|---|---|---|
| 10,311,119 B1* | 6/2019 | Gollapudi | ............. | G06F 16/287 |
| 10,916,335 B1* | 2/2021 | Chugh | ................... | H04L 63/18 |
| 2007/0073688 A1* | 3/2007 | Fry | ......................... | G06F 16/48 |
| 2012/0158863 A1* | 6/2012 | Kikin-Gil | .............. | H04L 67/10 709/206 |
| 2013/0054548 A1* | 2/2013 | Fosback | ................. | G06F 16/83 707/694 |
| 2013/0073401 A1* | 3/2013 | Cook | ................. | G06Q 30/0277 705/14.73 |
| 2014/0280632 A1* | 9/2014 | Torgersrud | ............. | H04L 51/52 709/206 |
| 2015/0178371 A1* | 6/2015 | Seth | ...................... | G06F 40/117 707/755 |
| 2016/0034451 A1* | 2/2016 | Angelini, II | ........... | G06F 16/41 707/737 |
| 2018/0034650 A1* | 2/2018 | Anderson | ............... | H04L 51/52 |
| 2018/0121476 A1* | 5/2018 | Bakke | ................... | G06F 16/122 |
| 2020/0110792 A1* | 4/2020 | Tsabba | .................... | G06F 3/167 |
| 2020/0159785 A1* | 5/2020 | Multerer | ............... | G06F 16/951 |
| 2020/0401635 A1* | 12/2020 | Singhal | ................. | G06Q 50/01 |
| 2022/0141276 A1* | 5/2022 | Sun | ...................... | H04N 21/435 709/219 |

* cited by examiner

*Primary Examiner* — Hosain T Alam
*Assistant Examiner* — Robert F May

(57) ABSTRACT

Systems and methods for searching data management systems. Administrative users may define rules for hashtags, and then the rules are dynamically applied on the fly when an end user searches customer data. Hashtags are used to filter records for specific data, so as to improve data search accuracy and efficiency.

18 Claims, 12 Drawing Sheets

▼ Rules

Define rules that control when this tag is displayed.

| FIELD | CONDITION | VALUE | |
|---|---|---|---|
| HCP Decile ▼ | Greater Than ▼ | 6 | ✕ |

✢ Add Condition

| FIELD | CONDITION | VALUE | | |
|---|---|---|---|---|
| HCP Market Access? | In | Yes/True | AND | ✕ |
| HCO Market Access? | In | Yes/True | | ✕ |

✦ Add Condition

FIG. 5E

SYSTEM AND METHOD FOR DATABASE SEARCHING AND REPORTING

CROSS-REFERENCE TO RELATED APPLICATIONS

The present application relates and claims priority to provisional patent application No. 63/256,525, filed Oct. 15, 2021, entitled "System and method for database searching and reporting." The provisional patent application is hereby incorporated by reference herein for all purposes.

BACKGROUND

The subject technology relates generally to customer data management.

In the pharmaceutical sales industry, sales representatives visit, call or send emails to doctors to communicate product information. Their company employers (e.g., pharmaceutical companies) often use a customer data storage system to manage the doctors' professional information and make such information available to sales representatives. Since the data storage system may manage a huge amount of data, and each data record may have hundreds of data fields, it is desirable to provide a method for improving data search efficiency and accuracy and helping users to find the data they are interested quickly.

SUMMARY

The disclosed subject matter relates to a method for searching a data management system, wherein the data management system comprises a data management server and a data storage device. The method comprises: in response to a first input, displaying a hashtag configuration user interface by a hashtag management device in the data management server, wherein the hashtag configuration user interface comprises at least one built-in hashtag which can be enabled for searching the data management system, and a first area for receiving inputs for creating a first custom hashtag for searching the data management system, and wherein the hashtag comprises a hash sign and a first phrase.

The method comprises: in response to a second input on the first area for receiving inputs for creating a first custom hashtag, displaying a hashtag creation user interface by the hashtag management device, wherein the hashtag creation user interface comprises a plurality of areas for receiving definition of the first custom hashtag.

The method comprises: receiving a name of the first custom hashtag at a first area on the hashtag creation user interface; receiving a first rule for defining the first custom hashtag at a second area on the hashtag creation user interface; and storing definition of the first custom hashtag in a hashtag storage device.

BRIEF DESCRIPTION OF THE DRAWINGS

FIGS. 5A to 5F illustrate example user interfaces for an administrative user to create hashtags according to one embodiment of the present invention.

DETAILED DESCRIPTION

Figure 1:
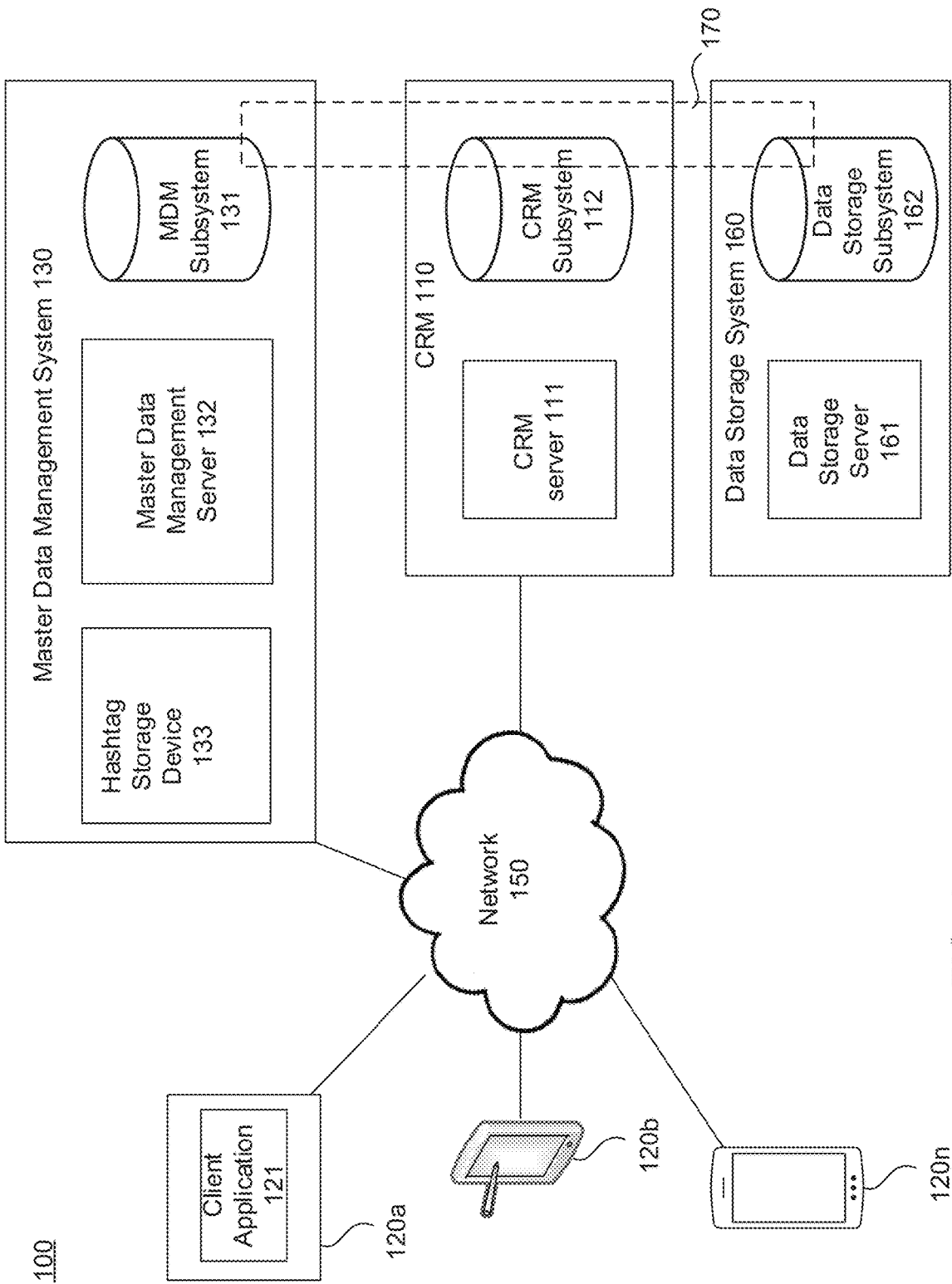
FIG. 1 illustrates an example high level block diagram of an enterprise data management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Data management system or data providers may provide a set of predefined hashtags that are enabled by default, or built-in hashtags. These built-in hashtags can be edited or disabled. Customer administrators and data managers can create custom hashtags for their specific business purposes, which are specific to a customer instance, and can be managed locally. They are supported for health care providers ("HCP"), health care organization ("HCO"), and custom data records.

The present invention may use hashtags to help to summarize important details of records. Record profiles may contain a lot of data. Users typically spend time on the profile analyzing the data to ensure they have the correct records. Hashtags may help to highlight important details of the records.

The present invention may improve search accuracy and efficiency. Sometimes, users know to search by name and address in basic search but are unsure of other fields and reference values that can help to filter the results. With the present invention, they can use hashtags to easily filter records for specific data. For example, if they search for UCLA hospital in the search bar of the data management system, the search results will display all records matching those keywords. This can include hospitals, health systems, clinics, HCPs, and so on. If they use the #hospital hashtag in the query, UCLA #hospital, the search results are filtered on records that mention UCLA and have the HCO Type field set to "hospital". Other HCO types and HCP records are filtered out from the results.

In one embodiment, the present invention may enable search for new targets by using hashtags to identify targets for sales representatives. For example, to find nurses that specialize in pediatrics at a specific hospital, end users can type the hospital name and use a #nurse hashtag and #pediatrics hashtag.

In one embodiment, the present invention may enable search for records from specific sources by creating hashtags for specific custom key sources so users can easily find records for those sources, e.g., #sales and #crm.

Hashtags are rule-based and are automatically calculated to display on record profiles that meet those rules. For example, the #npi hashtag displays on HCO and HCP records where the NPI field has a value (is not null).

FIG. 1 illustrates an example high level block diagram of an enterprise data management architecture 100 wherein the present invention may be implemented. The enterprise may be a business, or an organization. As shown, the architecture 100 may include a customer relationship management ("CRM") system 110, a plurality of user computing devices 120a, 120b, ... 120n, an MDM system 130, and data storage system 160, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 110 and the MDM 130 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access data in the MDM 130, the CRM 110, and the data storage system 160 via the network 150.

In one embodiment, the CRM 110 and the MDM 130 may be used to hold and manage the enterprise's data. The MDM 130 may store customer master data for the enterprise, which may include data from an MDM provider. A data steward service may be used to maintain the customer master data in the MDM 130 and make it accurate and up-to-date.

The CRM 110 may store customer data, e.g., account information, for the enterprise. Data in the CRM 110 may include those managed by the MDM 130 ("master data" or "master record", e.g., account, address and child account) and those not ("non-master data"). Non-master data may include records compiled by a customer ("customer owned records") and records provided by a third party ("third party records"). The master data in the MDM 130 may be synchronized with the MDM system regularly.

The CRM 110 may have a CRM server 111 and a CRM subsystem 112. The CRM server 111 is typically a remote computer system accessible over a remote or local network, such as the network 150. A client application (e.g., 121) process may be active on one or more user computing devices 120a-120n, and the corresponding server process may be active on the CRM server 111. The client application process and the corresponding server process may communicate with each other and with the master data management 130 over the network 150, thus providing distributed functionality and allowing multiple client applications to take advantage of the information-gathering capabilities of the CRM 110 and the MDM 130.

The CRM subsystem 112 may store data that client applications (e.g., 121) in user computing devices 120a-120n may use. In one embodiment, the CRM subsystem 112 may store data that pharmaceutical companies may need when promoting new products, which may include physician professional information (e.g., name, specialty, license information, affiliated HCO, contact information at the affiliated HCO, prior interaction record, electronic signature for samples, and medical inquiry submission), product information (e.g., name, category, lot and statistics), sales representative information (e.g., name, territory information, sharing rules and sales reports). It should be understood that the CRM subsystem 112 may store data for other industries. Data in the CRM subsystem 112 may include master data managed by the MDM 130 and non-master data, and the non-master data may include customer owned records and third party records.

The MDM 130 may include an MDM subsystem 131 and an MDM server 132. The MDM subsystem 131 may store customer master data which may be provided by an MDM provider. The customer master data may be many types of data which may be used by the enterprise, e.g., accounts, addresses and reference data. In one implementation, the MDM subsystem 131 may store verified HCP and/or HCO information for a pharmaceutical company, as the customer. In one example, the MDM subsystem 131 may store verified physician professional information of cardiologists in the U.S. compiled and/or purchased by a pharmaceutical company. Each HCP may be an account in the MDM subsystem 131. Master data (e.g., account, address and child account) managed by the MDM 130 may also be stored in DCR-controlled fields in the CRM subsystem 112.

The master data management server 132 may be used to cleanse, standardize and/or de-duplicate data from different sources to form the single, consolidated customer master data and store the customer master data in the MDM subsystem 131. This may help the enterprise to avoid using multiple and potentially inconsistent versions of the same data. Any changes to the customer master data will be displayed on the data steward interface 1328 shown in FIG. 3, so that a data steward may check the changes and update the customer master data when the changes are verified. The master data management server 132 may further notify the customer data storage system 110 about any updated accounts, so that the customer data storage system 110 may be updated with the changes.

In one implementation, the MDM 130, including the customer master data in the MDM subsystem 131, may be provided to the customer by an MDM provider as a software as a service ("SaaS"). In addition, like the CRM 110, the MDM 130 may be a cloud based multi-tenant system.

The data storage system 160 may include a data storage server 161 and a data storage subsystem 160, and store and manage HCP and HCO data.

A customer may subscribe to services of the enterprise data management architecture 100, and authorize end users associate with it to use the services.

Figure 2:
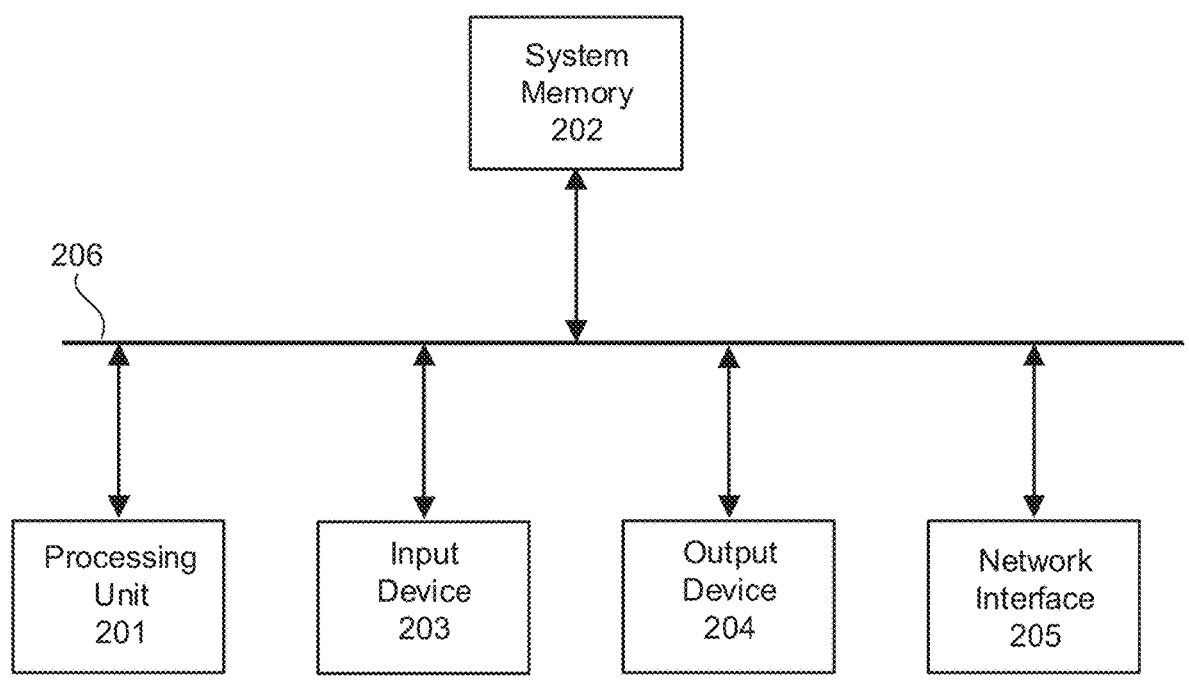
FIG. 2 illustrates an example high level block diagram of a computing device.

FIG. 2 illustrates an example high level block diagram of a computing device 200 which can be used as the user computing devices 120a-120n, the master data management server 132, and/or the CRM server 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
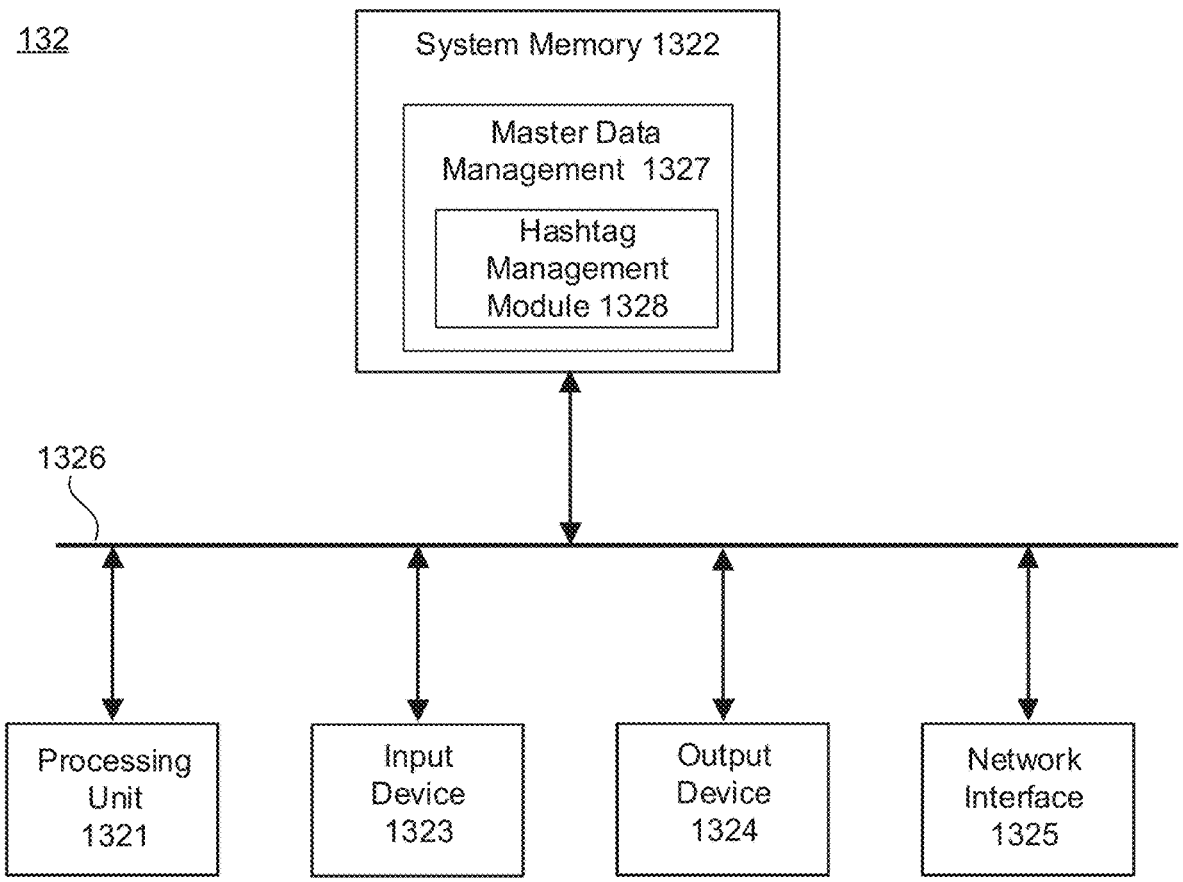
FIG. 3 illustrates an example high level block diagram of a master data management ("MDM") server according to one embodiment of the present invention.

FIG. 3 illustrates an example high level block diagram of the master data management server 132. The master data management server 132 may be implemented by the computing device 200, and may have a processing unit 1321, a system memory 1322, an input device 1323, an output device 1324, and a network interface 1325, coupled to each other via a system bus 1326. The system memory 1322 may store a master data management module 1327, which may be used to cleanse, standardize and de-duplicate HCP and/or HCO data from various sources to form the single, consolidated customer master data. The master data management module 1327 may include a hashtag management module 1328, and the hashtag management module 1328 may control the process described with reference to FIG. 4-FIG. 7.

The pharmaceutical companies may purchase service from an MDM provider to use the MDM 130, including the customer master data in the MDM subsystem 131. In one implementation, the MDM subsystem 131 may store address and license information of all physicians in a state, or all physicians with a specialty.

Figure 4:
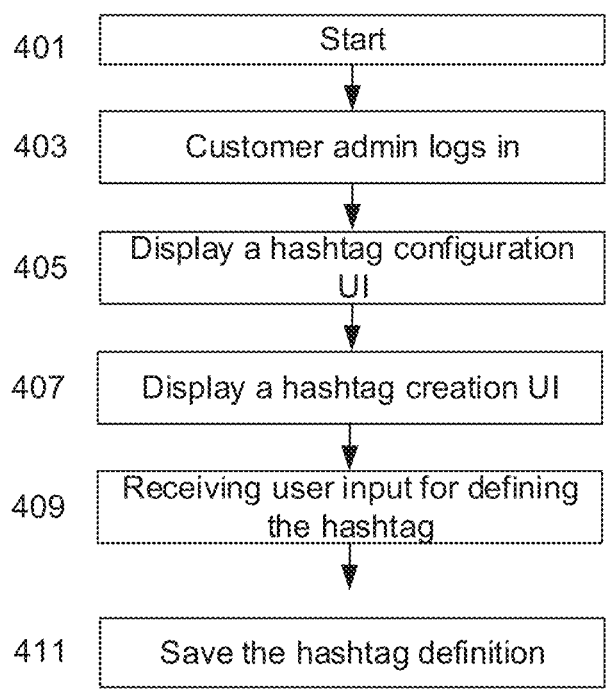
FIG. 4 illustrates an example flowchart of a method for creating a custom hashtag according to one embodiment of the present invention.

FIG. 4 illustrates an example flowchart of a method for creating a hashtag according to one embodiment of the present invention. The process may start at 401.

At 403, a customer administrator may log in the data management architecture 100 or a section of it (e.g., the MDM 130), and an administrator user interface may be displayed.

Figure 5A:

At 405, in response to a user request on the administrator user interface, a hashtag configuration user interface 500 may be displayed. The hashtag configuration user interface 500 may allow the administrator to configure hashtags to be used to search the customer's data 170, which may include the customer's subset of data in the MDM 130, and/or the CRM 110. The hashtag may also be used to search data in the data storage system 160. As shown in FIG. 5A, the hashtag configuration user interface 500 may display built-in hashtags provided by the data management architecture 100, e.g., #clinic, #dept, and #dr. The administrator can enable or disable the built-in hashtags.

Figure 5B:
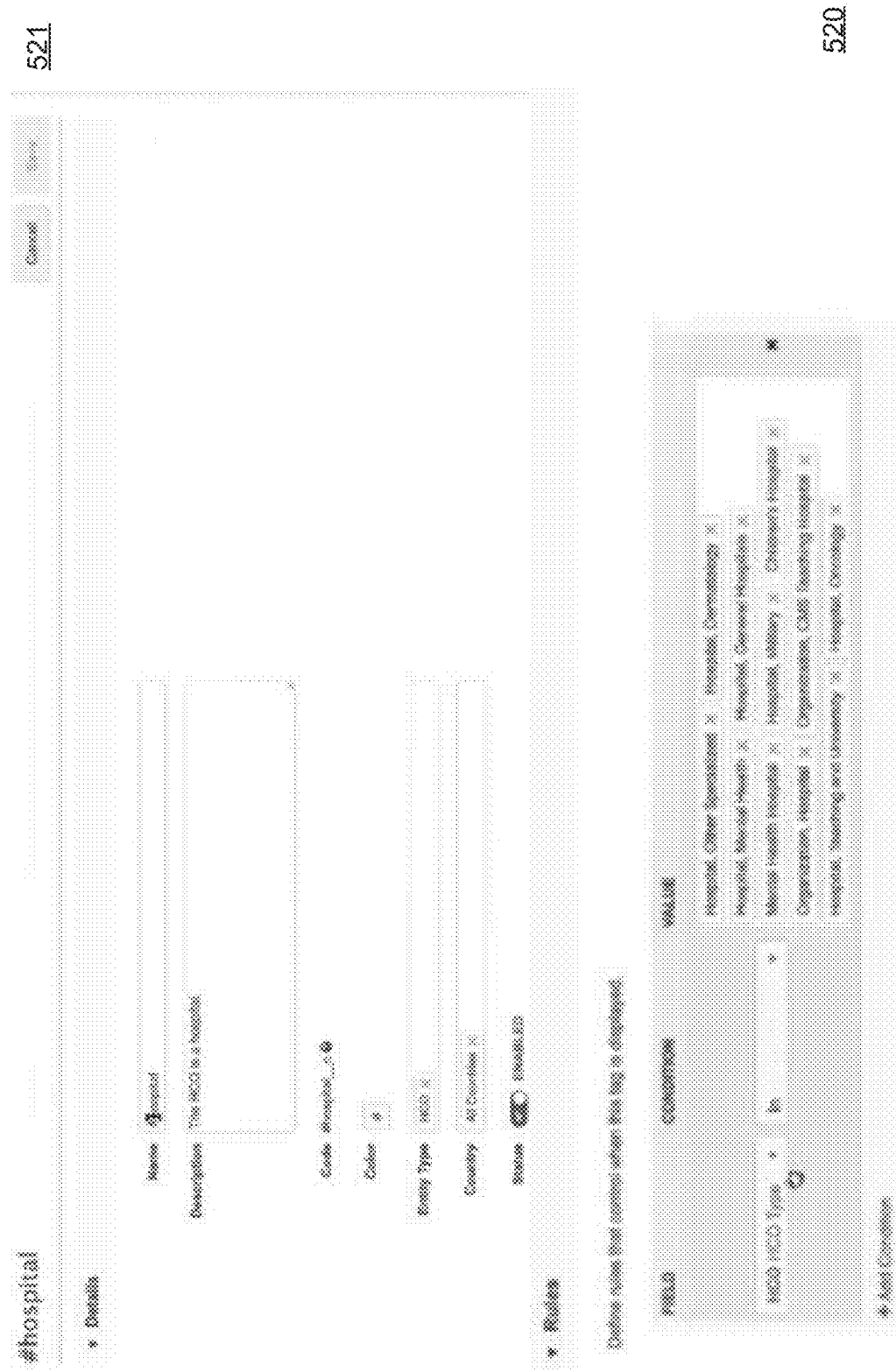

The administrator may also create custom hashtags, e.g., by clicking on an Add button 502 on the hashtag configuration user interface 500. At 407, in response to the user request, a hashtag creation user interface 520 may be displayed. In FIG. 5B, the hashtag creation user interface 520 may have a number of windows for receiving user inputs for defining the hashtag #hospital.

At 409, user input for defining the hashtag may be received at the windows on the hashtag creation user interface 520. As shown, its Name may be defined as #hospital, its Description may be defined as "The HCO is a hospital", its Entity Type may be defined as "HCO", and its Country may be defined as "All Countries".

The hashtag name is the name that displays in search and on the profile page. Hashtag names are prefixed with the hash #symbol.

The administrator user may choose a different background color for hashtags that he/she wants to be highlighted.

In one embodiment, a country list may be displayed, which may include the countries that the customer has access to through its data visibility profiles. The administrator user may choose "all applicable countries" to apply the hashtag to all countries that the customer instance has data for.

The rules that control when the hashtag is displayed may also be defined, e.g., by inputs in the windows Field, Condition, and Value. As shown in FIG. 5B, when the data field "HCO Type" of an object matches one of the inputs in the Value window, the hashtag #hospital may be displayed.

In one embodiment, a rule may be created based on a Decile custom field. The #highdecile hashtag may be displayed on HCP records only where the value of the Decile field is greater than six, as shown in FIG. 5C.

Fields. A list of fields may contain the fields that apply to the main objects defined for the Entity Type.

Condition. Available conditions depend on the selected field type. For example, text fields support the Equals, Contains, and Is Not Null conditions; and integer number fields support the Greater Than, Less Than, Between, and Equals conditions.

Rules. Rules may be created for custom key fields.

Values. Define the field value.

More conditions may be added, and multiple conditions are treated as AND operators. For example, if the administrator user wants sales representatives to easily find new targets for doctors that specialize in neurology, he/she can add multiple conditions to the rule: only HCP records that have the HCP type Doctor AND that have specific values in the Specialty 1 field will have the hashtag applied, as shown in FIG. 5D.

In one embodiment, if the hashtag applies to multiple entity types, the condition for each entity type is treated individually, as shown in FIG. 5E.

Figure 5F:

In one embodiment, hashtags can be used to easily find records from a specific source. Previously, users had to search for custom keys. With the present invention, administrators can create a hashtag for a specific source so users can filter their search on that source, as shown in FIG. 5F.

At 411, the definition of the hashtag #hospital may be saved to the hashtag storage device 133 when the Save button 521 is clicked on. The hashtag will be able applied to records that meet the rules. End users can now search for the hashtag and see it on record profiles.

Figure 6:
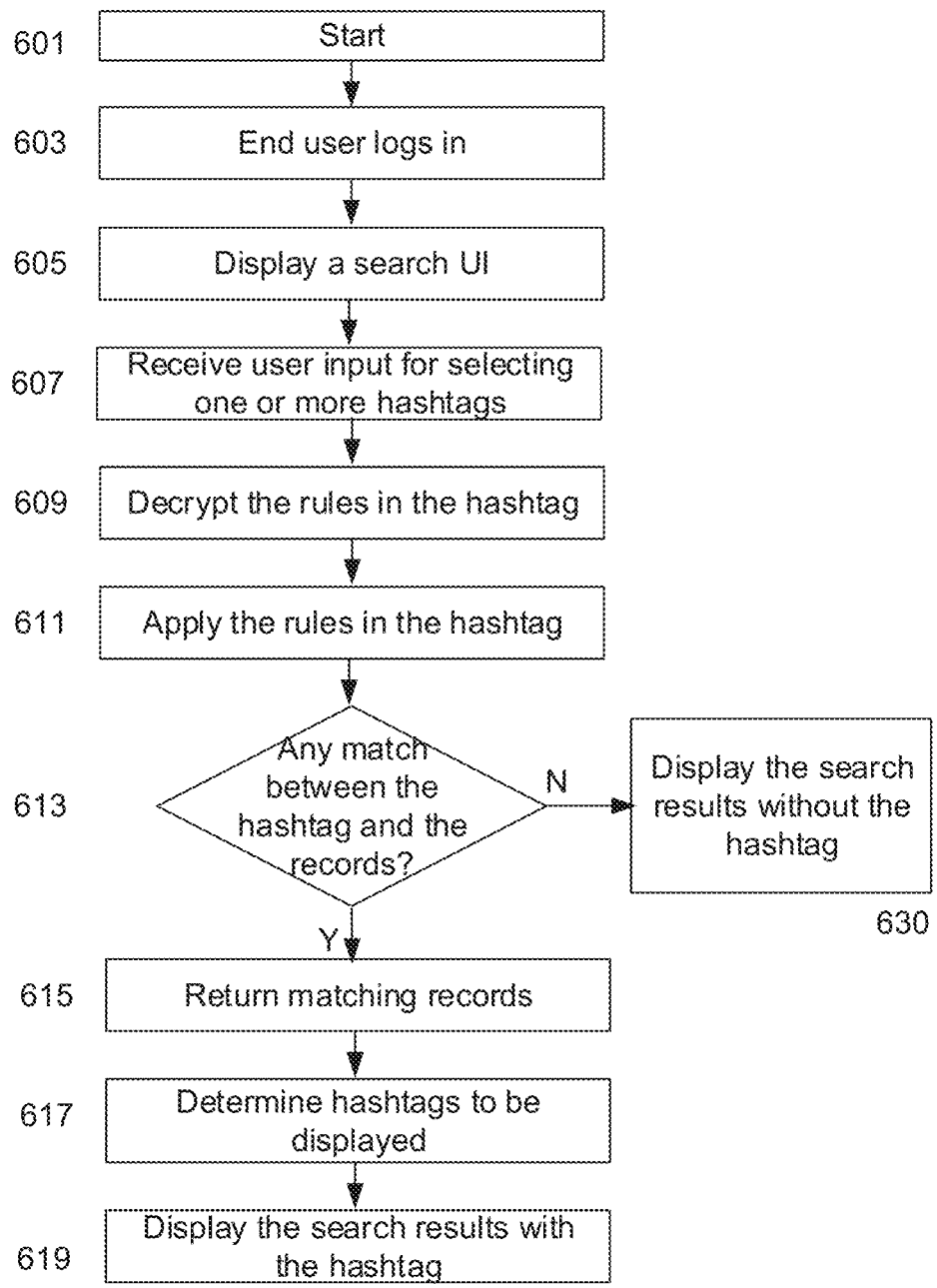
FIG. 6 illustrates an example flowchart of a method for searching a customer data management system and displaying search results according to one embodiment of the present invention.
Figure 7:
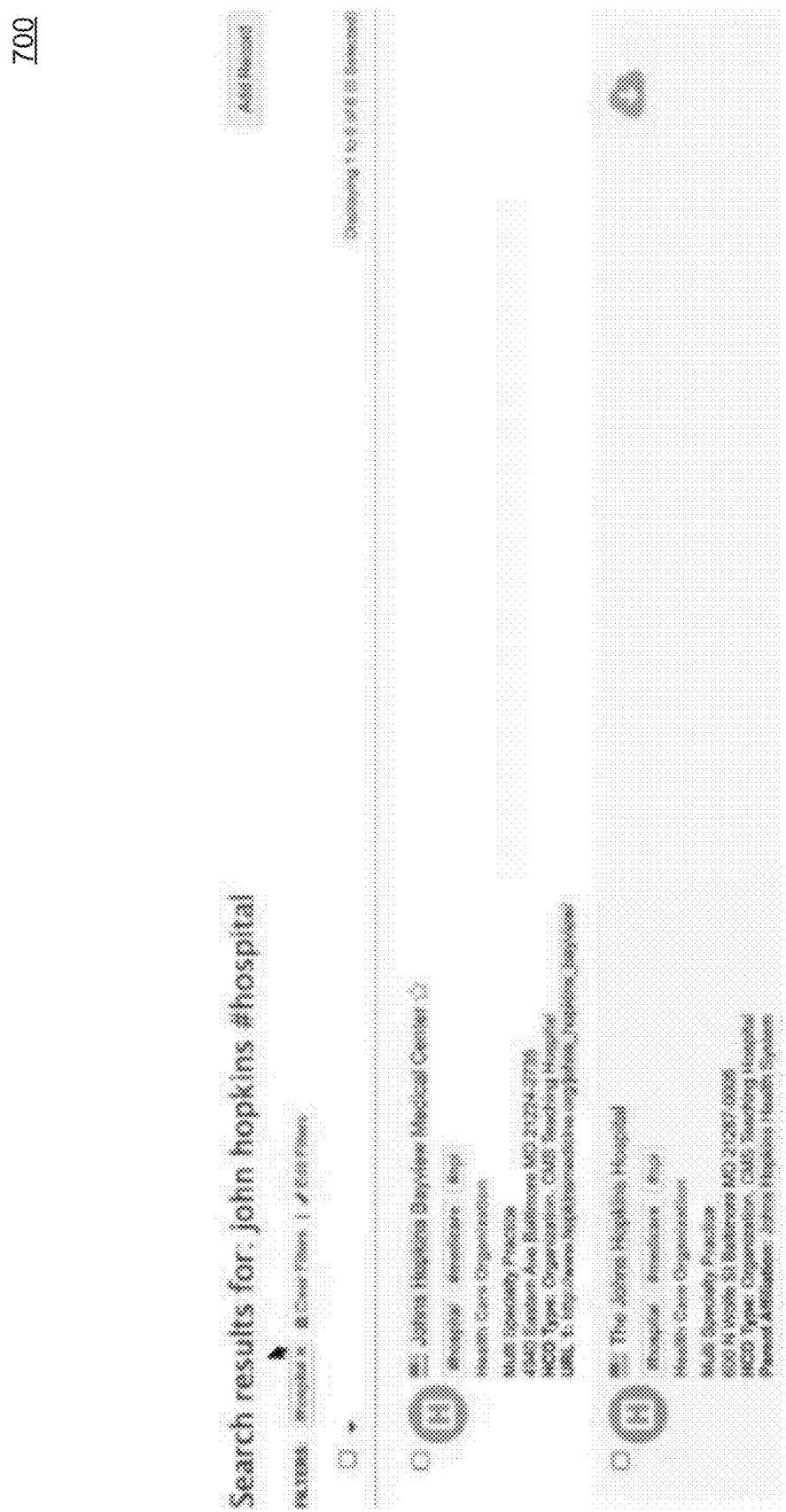
FIG. 7 illustrates an example user interface for displaying search results and hashtags according to one embodiment of the present invention.

FIG. 6 illustrates an example flowchart of a method for searching the data management architecture 100 and displaying search results according to one embodiment of the present invention. The process may start at 601.

At 603, an end user may log in the data management architecture 100, or a section of it (e.g., the master data management system 130).

At 605, a data search user interface may be displayed. The data search user interface may display hashtags available to the end user. The hashtags may include the built-in hashtags, and custom hashtags created by the administrator. Hashtags may be displayed in alphabetical order. They can be displayed in different colors depending on how administrators have configured them.

In one embodiment, a list may display the hashtags that are available according to the countries and entities that users have access to through their data visibility profile. The available hashtags are listed alphabetically and contain a description.

At 607, end user inputs for selecting one or more hashtags may be received, together with a search query. An end user may scroll and select a hashtag or keep typing to find a specific hashtag. The end user may choose one or more hashtags and include any text that he/she also want to filter on, and then click the Search button to start a search for records with the hashtag(s). In one example, the hashtag may be #hospital.

At 609, the rules of the hashtags may be decrypted to be applied in a search engine, e.g., a search engine in the master data management server 132.

At 611, the rules may be applied in the search engine and run against the data records in the customer data, which may include the customer's subset of data in the MDM 130, and/or the customer's subset of data in the CRM 110.

At 613, it may be determined if there is a match between the selected hashtag(s) and data fields of the objects in customer data.

In one embodiment, filters based on the rules in hashtag definitions may be used. In one example, when a user searches for John Hopkins Hospital, and selects the hashtag #hospital, a filter may be set up for "hospital" to make records' HCO types hospital related. The search results may be narrowed down, and only data records having "John Hopkins" in their names and having HCO types as "hospital", will be returned. There may be thousands of records with "John Hopkins" in their names, but as long as their HCO types are not "hospital", they won't be returned as search results.

If not, the process may proceed to 630 to display the search results without a hashtag.

At 615, if there is a match between a selected hashtag and a data field, matching records may be returned.

At 617, the hashtag(s) to be displayed may be determined. The rules that control when the hashtag is displayed may also be applied. As shown in FIG. 5B, when the data field "HCO Type" of an object matches one of the inputs in the Value window, the hashtag #hospital may be displayed.

At 619, the hashtag and the record with the matching data field may be displayed on the search result page.

The search results display the records that apply to the hashtags and any search terms that users defined. If users use more than one hashtag in the query, they are treated as an AND operator. For example, if the search query includes the #nurse and #pediatrics hashtags, only the records that meet the conditions of both hashtags will display. If users use hashtags that apply to the same field (for example, the #nurse and #md hashtags both apply to the MedicalDegree field), it is treated as an OR operator; records that have a medical degree that is nurse related or a Doctor of Medicine will display.

Hashtags display on the records and on the search results in alphabetical order. If end users search for a hashtag, it displays first on the record results. Hover over a hashtag to view a tooltip. If the tooltip contains extra details, for example, the NPI ID number or degree name, the user may click a Copy icon to copy the value to a clipboard. If the end user clicks a hashtag on a record in the search results, it will start a new search for that hashtag.

In the present invention, rules may be defined for hashtags, and then the rules are dynamically applied on the fly when an end user searches the customer data. The hashtags are not saved in the database (e.g., the MDM 130, the CRM 110, or the data storage system 160) on the records, but are dynamically calculated in real time based on the rules in the hashtag configuration and displayed with the search results. Users do not have to update records in the database to add hashtags. For example, if end users use the predefined hashtags called #crm and #md in their search query, the hashtags are automatically applied to HCP records that meet each hashtag rule (the custom key source contains CRM and the HCP medical degree field value is Doctor of Medicine).

In the example described with reference to FIG. 6, when a record with "John Hopkins" in its name is stored to the MDM 130 or the CRM 110, the HCO type is filled out, e.g., as "hospital". But the hashtag #hospital is not stored in the MDM 130 or the CRM 110 for record and it is not necessary to make any changes to the data MDM 130 or CRM 110 to use the hashtags. If an end user selects the hashtag for a search, the hashtag rules may be applied. If there is any match between the hashtag and the customer data, the hashtag and the record matching the hashtag may be displayed.

In addition, since the rules for the hashtag #hospital define organizations to be included in "hospital", end users do not have to choose which organizations are included in "hospital" one-by-one.

Although the embodiments are described with a customer instance, the hashtags may be applied to the records that are not in customer instance.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for searching a data management system, wherein the data management system comprises a data management server and a data storage device, the method comprising:
    in response to a first input, displaying a hashtag configuration user interface by a hashtag management device in the data management server, wherein the hashtag configuration user interface comprises at least one built-in hashtag which can be enabled for searching the data management system, and a first area for receiving inputs for creating a first custom hashtag for searching the data management system, and wherein the hashtag comprises a hash sign and a first phrase;
    in response to a second input on the first area for receiving inputs for creating a first custom hashtag, displaying a hashtag creation user interface by the hashtag management device, wherein the hashtag creation user interface comprises a plurality of areas for receiving definition of the first custom hashtag;
    receiving a name of the first custom hashtag at a first area on the hashtag creation user interface;
    receiving a first rule for defining the first custom hashtag at a second area on the hashtag creation user interface, wherein the first rule defines that a first field of a first data record in the data management system has a first value with a first condition dependent on a first field type of the first field, and wherein the first field is a decile custom field; and
    storing definition of the first custom hashtag in a hashtag storage device.

2. The method of claim 1, wherein the data management system is a master data management system, and comprises a master data management server and a master data management subsystem for storing master data.

3. The method of claim 1, wherein the data management system is a customer relationship management ("CRM") system, and comprises a CRM server and a CRM subsystem for storing CRM data.

4. The method of claim 1, wherein the data management system comprises a data management server and a data management subsystem for storing data.

5. The method of claim 1, further comprising: enabling the built-in hashtag.

6. The method of claim 1, wherein a second rule controls when the first custom hashtag is displayed.

7. The method of claim 1, further comprising: displaying a search user interface, which comprises a third area for receiving selection of a search hashtag and a fourth area for receiving a search query.

8. The method of claim 7, wherein the search hashtag is a built-in hashtag.

9. The method of claim 7, wherein the search hashtag is the first custom hashtag.

10. The method of claim 7, further comprising: receiving a selection of the search hashtag at the third area and the search query at the fourth area.

11. The method of claim 10, further comprising: decrypting the first rule.

12. The method of claim 11, further comprising: running the first rule against data records in the data management system, and determining if there is a match between the search hashtag and the data records.

13. The method of claim 10, further comprising: returning matching records if there is a match between the search hashtag and the data records.

14. The method of claim 13, further comprising: determining that the search hashtag should be displayed with matching records.

15. The method of claim 1, further comprising: applying the first rule and determining that the first field of the first record in the data management system has the first value according to the first rule.

16. The method of claim 1, further comprising: filtering records in the data management system with filters based on the first rule.

17. The method of claim 1, further comprising: wherein the first condition is at least one of the following: greater than, less than, between or equal.

18. The method of claim 1, further comprising: wherein the first rule defines that a second field of the first data record in the data management system has a second value with a second condition dependent on a second field type of the second field.

\* \* \* \* \*